United States Patent [19]

Xie

[11] Patent Number: 6,067,839

[45] Date of Patent: May 30, 2000

[54] METHOD OF MOUNTING A FASTENER ELEMENT, AND A FASTENER ELEMENT AND TOOL FOR CARRYING OUT SAID METHOD

[75] Inventor: Max Xie, Lund, Sweden

[73] Assignee: ABB AB, Vasteras, Sweden

[21] Appl. No.: 09/142,875

[22] PCT Filed: Mar. 12, 1997

[86] PCT No.: PCT/SE97/00420

§ 371 Date: Sep. 16, 1998

§ 102(e) Date: Sep. 16, 1998

[87] PCT Pub. No.: WO97/35117

PCT Pub. Date: Sep. 25, 1997

[30] Foreign Application Priority Data

Mar. 20, 1996 [SE] Sweden ................................. 9601068

[51] Int. Cl.[7] .............................. B21D 9/05; B21D 31/00
[52] U.S. Cl. .................................. 72/391.8; 29/243.526; 228/114.5
[58] Field of Search ...................... 72/391.8; 29/243.526; 228/114.5

[56] References Cited

U.S. PATENT DOCUMENTS

| | | |
|---|---|---|
| 3,144,710 | 8/1964 | Hollander et al. .................... 228/114.5 |
| 3,181,338 | 5/1965 | Zetterlund . |
| 3,452,421 | 7/1969 | Cheng et al. . |
| 3,477,115 | 11/1969 | Martin et al. . |
| 3,495,321 | 2/1970 | Shaff et al. . |
| 3,616,980 | 11/1971 | Padilla ................................ 228/114.5 |
| 3,749,298 | 7/1973 | Hasui .................................. 228/114.5 |
| 3,777,540 | 12/1973 | Siebol et al. . |
| 3,906,776 | 9/1975 | Humphreys et al. . |
| 4,087,038 | 5/1978 | Yagi . |
| 4,331,280 | 5/1982 | Terabayashi et al. ............... 228/114.5 |
| 5,452,505 | 9/1995 | Gasser ................................ 29/243.526 |
| 5,511,298 | 4/1996 | Gasser ................................ 29/243.526 |
| 5,771,738 | 6/1998 | Ko ....................................... 72/391.8 |

FOREIGN PATENT DOCUMENTS 889342  12/1981  U.S.S.R. .

*Primary Examiner*—David Jones
*Attorney, Agent, or Firm*—Young & Thompson

[57] ABSTRACT

The invention relates to a method for mounting a fastener element (1), such as a screw or a nut, in a component (2). The fastener element (1) is provided with a deformable, cylindrical portion (3) which has an axis of symmetry. The cylindrical portion (3) is inserted in a through-hole (4) in the component (2), whereafter the cylindrical portion (3) is deformed in its longitudinal direction by means of a compressive force, so that the length of the cylindrical portion (3) is reduced. By causing the fastener element to rotate at a predetermined rotational speed so that frictional heat is generated between the contact surfaces of the fastener element (1) and the component (2), there is created a combined rivet and frictional welding joint between the fastener element (1) and the component (2). The invention also relates to a tool for mounting the fastener element in accordance with the method.

11 Claims, 3 Drawing Sheets

METHOD OF MOUNTING A FASTENER ELEMENT, AND A FASTENER ELEMENT AND TOOL FOR CARRYING OUT SAID METHOD

The present invention relates to a method for mounting a fastener element, such as a screw or nut in a component, said fastener element being provided with a deformable, cylindrical portion which has an axis of symmetry, said cylindrical portion being inserted into a through-hole in the component, whereafter the cylindrical portion is deformed in its longitudinal direction by means of a compressive force, so that the length of the cylindrical portion is reduced. The invention also relates to a tool for mounting the fastener element in accordance with the method.

In motor vehicle manufacture it is usual that various components such as strips, rails, equipment etc. are fastened to thin-walled components, such as sheet metal or profiles of aluminum, for example. A common method of connecting components is to use a fastener element having a screw thread. Such fastener elements include i.a. screws and nuts. Problems arise, however, if the aluminum sheet metal or profile is to be provided with a threaded hole, since aluminum is a relatively soft metal. This means that the tightening torque for a steel screw in the threaded hole will be very limited, and thus the component mounted by means of the screw can easily loosen.

In order to solve the above mentioned problem, known technology has suggested that a fastener element in the form of a so-called rivet nut be inserted into a circular hole in the component. The rivet nut consists of a cylinder having a through-hole provided with an internal thread. The rivet nut can be made of steel to provide a durable thread. One end of the cylinder is provided with a flange to abut against the surface of the component around the hole. By inserting the cylinder into the circular hole arranged in the component so that the flange abuts against the surface of the component and then deforming the cylinder, a rivet fastener is formed by a bead formed on the cylinder clamping the component between the flange and the bead.

The clamping force on the component weakens, however, with time, due to creep tensions in the component material being evened out. This means that the rivet nut can rotate freely relative to the component, making it very difficult to screw in or out a threaded fastener element in the rivet nut. If the rivet nut can rotate freely relative to the component, a gap is formed between the rivet nut and the component into which moisture can penetrate. This can result in corrosion of the material surrounding the gap.

The main purpose of the present invention is to provide a component with a fastener element which can withstand high torque.

Another purpose of the present invention is to achieve a method of mounting a fastener element in a component, so that a permanent joint between the fastener element and the component is formed.

An additional purpose of the present invention is to mount a fastener element in a component, so that a gas- and liquid-tight joint is formed between the fastener element and the component.

Still another purpose of the present invention is to achieve a tool which makes it possible to mount a fastener element in a component from one side of the component only.

In the method described by way of introduction, this is achieved by virtue of the fact that a torque is applied about the axis of symmetry of the cylindrical portion, that the torque is measured, and that the compressive force is kept constant or is caused to be reduced when the torque, due to the deformation of the cylindrical portion, reaches a predetermined value, that a torque exceeding the predetermined torque is thereafter applied about the axis of symmetry of the cylindrical portion so that the fastener element begins to rotate at a predetermined rotational speed, generating friction heat between the contact surfaces of the fastener element and the component, that the rotation is stopped when a predetermined condition has been fulfilled, and that the cylindrical portion, by means of compressive force, is thereafter further deformed in its longitudinal direction so that a combined rivet and frictional welding joint between the fastener element and the component is obtained.

In order to mount the fastener element according to the method, there is suggested according to the invention a tool comprising first and second rotary shafts which are mounted in a housing. The tool is characterized in that the first rotary shaft has a first and a second end, said first end being provided with a holder which is intended for the fastener element, that the second rotary shaft is concentric with the first shaft and the second rotary shaft has a first and a second end, said first end being provided with an abutment which is intended to abut against the fastener element, that the first end of the first shaft and the first end of the second shaft are directed in the same direction, that the first shaft is axially displaceable relative to the second shaft by means of a first force means, that the first shaft is rotatably driven by means of a second force means, and that the second force means is coupled to the first shaft by means of a coupling which permits the first shaft to be displaced axially relative to the first force means.

The invention will be described in more detail below through a number of examples with reference to the accompanying drawings.

Figure 1:
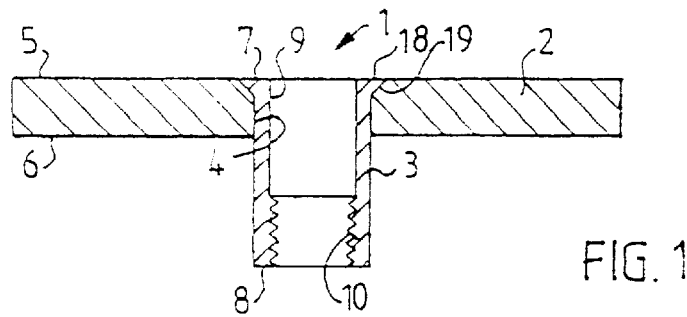
FIGS. 1–4 show in principle how a fastener element according to a first embodiment is mounted in a hole in a component by means of the method according to the present invention.

According to FIGS. 1–4, a fastener element 1 in accordance with a first embodiment is mounted in a component 2. In FIG. 1, the fastener element 1, which in this first embodiment is a nut, comprises a cylindrical portion 3, which is inserted into a through-hole 4 in the component 2. The hole extends from a first surface 5 to a second surface 6 of the component 2. The cylindrical portion 3 has an axis of symmetry which extends from a first end 7 to a second end 8 of the cylindrical portion 3.

The hole 4 can be suitably drilled or made in some other manner in the component before the cylindrical portion 3 of the fastener element 1 is inserted into the hole 4. It is, however, conceivable that the cylindrical portion be provided with a drill tip (not shown) at its second end 8. By causing the fastener element 1 to rotate and at the same time moving it towards the component, the drill tip can drill the hole 4 in the component 2 intended for the cylindrical portion 3, whereafter the cylindrical portion 3 is inserted into the hole 4 far enough so that the first end 7 will lie flush with the first surface 5 of the component.

The cylindrical portion 3 is made with a circular through-hole 9, which extends from the first end 7 to the second end 8. In the circular through-hole 9 a screw thread 10 is arranged adjacent to the second end 8.

If the component 2 consists, for example, of aluminum sheeting, the fastener element 1 is suitably made of stainless steel to obtain high strength of the screw thread 10 as well as good corrosion resistance. It is, however, conceivable to use other materials in the fastener element 1 and the component 2.

Figure 2:
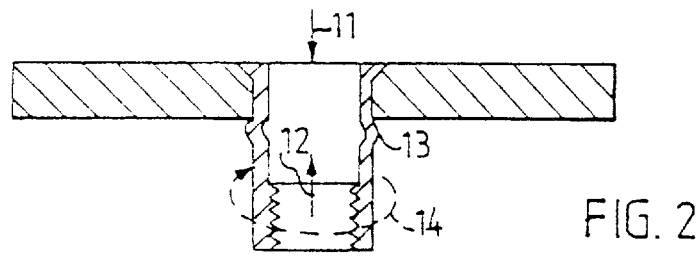

After the cylindrical portion 3 of the fastener element 1 has been inserted into the 5 through-hole 4 in the component 2, the cylindrical portion 3 is deformed in its longitudinal direction by means of a compressive force which is indicated by the arrows 11 and 12 in FIG. 2. The length of the cylindrical portion 3 is thus reduced and a bead 13 is formed, which will abut against the second surface 6 of the component 2. As the compressive force is acting, a torque can be applied about the axis of symmetry of the cylindrical portion 3, as indicated by the dashed arrow 14 in FIG. 2. The torque is measured by suitable measuring means (not shown). The compressive force is kept constant or is caused to be reduced when the torque, due to the deformation of the cylindrical portion 3, reaches a predetermined value. This predetermined value depends on the combination of materials and the dimensions of the fastener element 1 and the hole 4 in the component.

Figure 3:
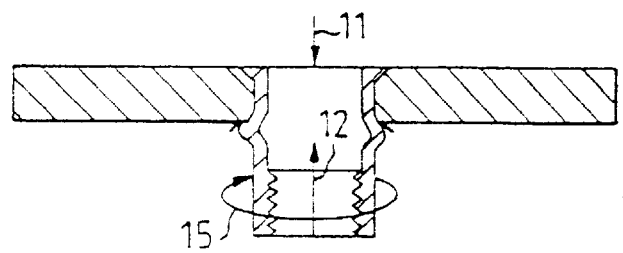
Figure 4:
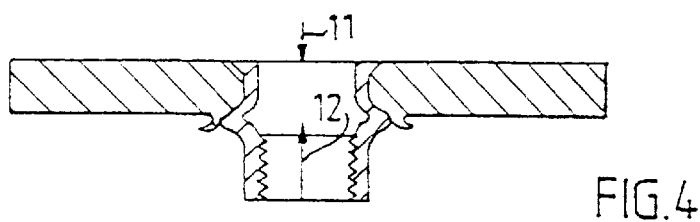

A torque is thereafter applied exceeding the predetermined torque about the axis of symmetry of the cylindrical portion 3 so that the fastener element 1 begins to rotate at a predetermined rotational speed, which is indicated by the arrow 15 in FIG. 3. When the fastener element 1 rotates, frictional heat is generated between the contact surfaces of the fastener element 1 and the component. When a predetermined condition has been fulfilled, such as the passage of a predetermined period of time, the rotation is stopped and the cylindrical portion 3 is thereafter deformed further in its longitudinal direction by means of compressive force, as indicated by the arrows 11 and 12 in FIG. 4, so that a combined rivet and frictional welding joint between the fastener element 1 and the component 2 is obtained. The above mentioned predetermined rpm and the predetermined time depend on material combinations and dimensions in the fastener element 1 and the hole 4 in the component 2. It is conceivable that the rise in temperature due to the friction can be measured and that the rotation can be stopped when the temperature reaches a predetermined level.

When the fastener element 1 rotates and frictional heat is generated between the contact surfaces of the fastener element 1 and the component 2, the compressive force can be kept constant or, as an alternative, be increased continuously or in increments.

Figure 5:
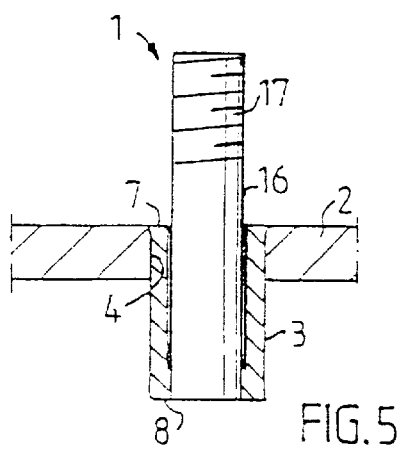
FIGS. 5 and 6 show in principle how a fastener element according to a second embodiment is inserted into a hole in a component and is fixed by means of the method according to the present invention.

Instead of using an internally threaded fastener element, as is used in the first embodiment, an externally threaded fastener element can be used according to a second embodiment, as shown in FIG. 5. The fastener element 1 comprises a cylindrical portion 3 which is provided with a stud 16, which is joined to the cylindrical portion 3 at its second end 8. The stud 16 extends from the second end 8 towards and past the first end 7, and the stud 16 is provided with an external screw thread 17 in the portion which extends past the first end 7 of the cylindrical portion 3.

Since the stud 16 is joined to the cylindrical portion 3 only in the area of the second end 8, two facing surfaces are created on the stud 16 and on the cylindrical portion 3. These surfaces will move in opposite directions relative to each other along the axis of symmetry of the fastener element 1.

Figure 6:
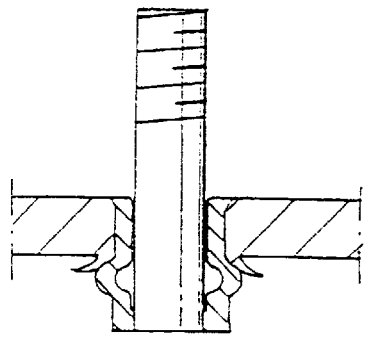

The mounting of the fastener element 1 in a hole 4 in a component 2 is carried out in the same manner as described above in connection with the first embodiment. During mounting a combined rivet and frictional welding joint is formed between the fastener element 1 and the component 2, as shown in FIG. 6.

The first end 7 of the cylindrical portion 3 can be provided with a flange 18 which is intended to be in contact with the first surface 5 of the component 2 around the hole 4 or in a depression 19 in the first surface 5 around the hole 4.

Figure 7:
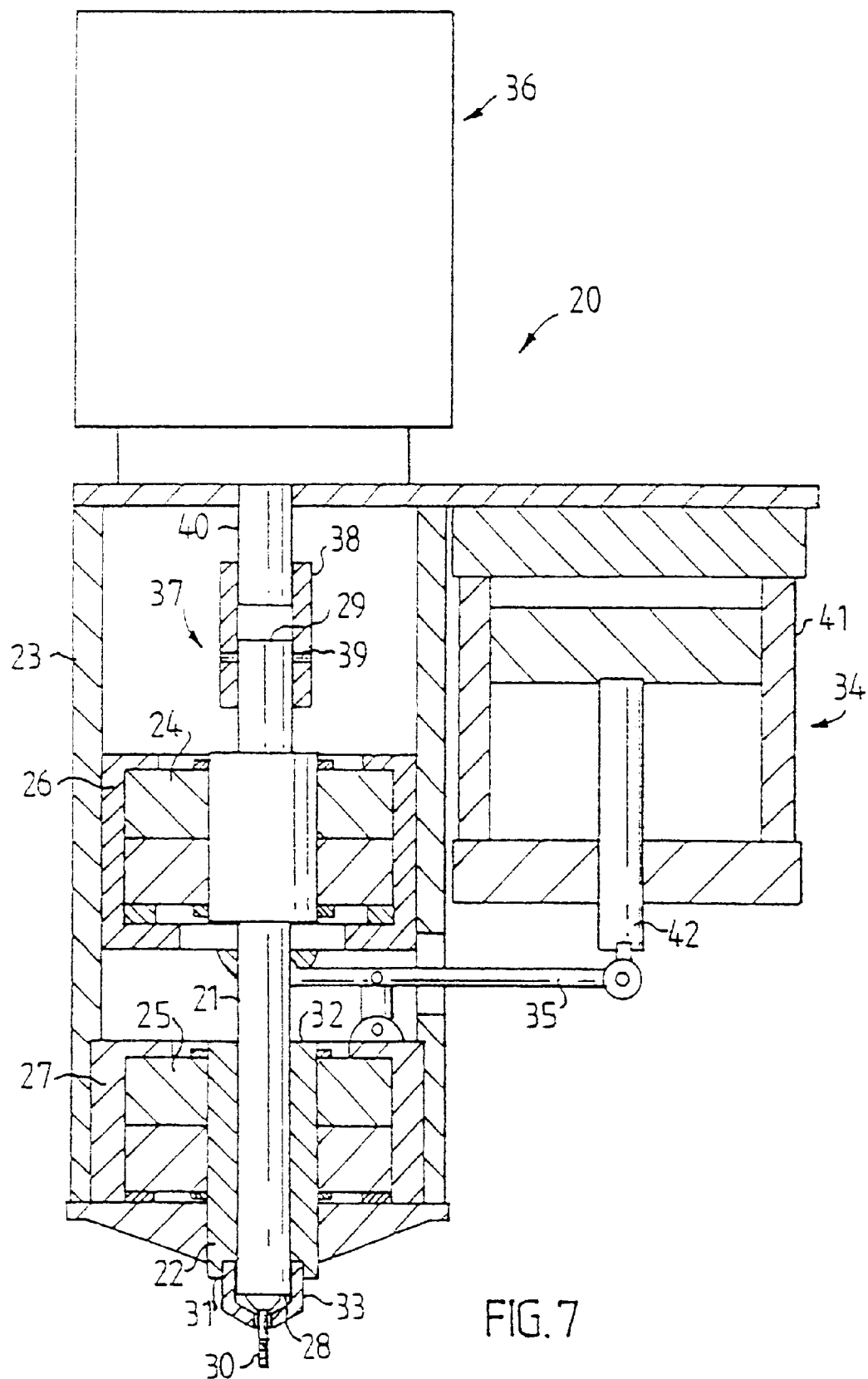
FIG. 7 shows a tool according to a first embodiment.

For mounting of the fastener element 1 in the component 2, a tool according to the present invention can be used. FIG. 7 shows a tool 20 according to a first embodiment. The tool comprises first and second rotary shafts 21, 22, each of which is mounted in a housing 23 by means of first and second bearings 24 and 25. respectively. The first bearing 24 is a roller bearing, the outer bearing ring 26 of which can be displaced axially and slide against the inner surface of the housing 23. The second bearing 25, which is the bearing for the second shaft 22, is axially fixed in the housing 23 with its outer bearing ring 27.

The first rotary shaft 21 has first and second ends 28, 29, the first end 28 being provided with a holder 30 intended for the fastener element 1. If the fastener element 1 according to the above described first embodiment is to be mounted in the component 2, the holder 30 must be an externally threaded pin, the screw thread of which fits the internal screw thread 10 of the cylindrical portion 3. If the fastener element 1 according to-the above described second embodiment is to be mounted in the component 2, the holder 30 must be an internally threaded sleeve, the screw thread of which fits the external screw thread 17 of the stud 16.

The second rotary shaft 22 of the tool 20 surrounds the first shaft 21 concentrically, and the second rotary shaft 22 has first and second ends 31, 32, said first end 31 being provided with an abutment 33 intended to abut against the cylindrical portion 3 of the fastener element 1.

The first end 28 of the first shaft 21 and the first end 31 of the second shaft 22 are directed in the same direction, which means that the abutment 33 will be in contact with the first end 7 of the cylindrical portion 3 or a flange 18 disposed on the first end of the cylindrical portion 3.

In order to achieve a compressive force on the cylindrical portion 3, when mounting the fastener element 1 in the component 2, the first shaft 21 is displaceable axially relative to the second shaft 22 by means of a first force means 34. The first shaft thus provides, by means of the first force means 34, a force which pulls the second end 8 of the cylindrical portion 3 towards the first end 7 of the cylindrical portion 3. At the same time the abutment 33 of the second shaft 22 exerts a counterforce against the first end 7 of the cylindrical portion 3 towards the second end 8 of the cylindrical portion. It should be pointed out in this context that in order to move the cylindrical portion of the fastener element into a hole 4 in the component 2, the entire tool 20 is moved with a fastener element I attached to the holder 30. In order to perform this movement, a robot can be used for example.

The first and second shafts 21, 22 are locked circumferentially in relation to each other, which means that they cannot rotate relative to each other. The first shaft 21 can, however, be displaced axially relative to the second shaft 22, as mentioned above. Circumferential locking can be achieved, for example, by means of splines (not shown).

According to the first embodiment shown in FIG. 7, the first force means 34 is located outside the housing 23 and a lever 35 arranged on the first force means 34 transmits a linear movement from the first force means 34 to the first shaft 21 via the bearing 24 which constitutes the bearing between the first shaft 21 and the housing 23.

The first shaft 21 is rotatably driven by means of a second force means 36. By coupling the second force means 36 to the first shaft 21 by means of a coupling 37 which permits the first shaft 21 to be axially displaceable relative to the first force means 36, the first shaft 21 can rotate at the same time as it can be displaced axially by means of the first force means 34. The coupling 37 can, for example, be a sleeve 38 which is arranged at the second end 29 of the first shaft 21 by means of a lock pin 39 inserted through a radially directed hole in the sleeve 38 and the first shaft 21. The sleeve 38 is locked circumferentially relative to a rotary shaft 40 of the second force means 36 by splines, for example.

Figure 8:
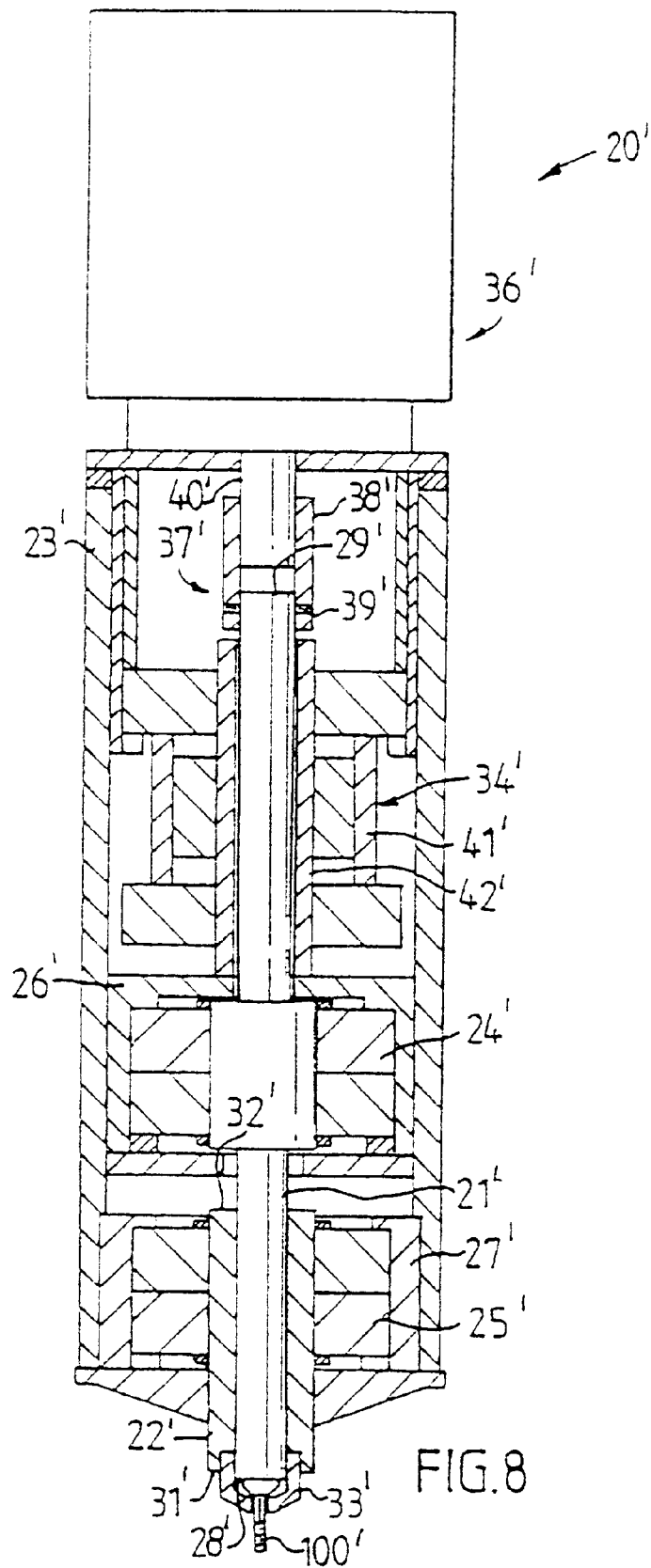
FIG. 8 shows a tool according to a second embodiment.

FIG. 8 relates to a second embodiment of a tool 20' according to the invention. The tool 20' according to this embodiment functions in the same manner as the tool 20 according to the first embodiment, with the difference, however, that the first force means 34' is located inside the housing 23' and surrounds the first rotary shaft 21'.

The first force means 34' transmits a linear movement to the first shaft 21' via the bearing 24' constituting the bearing between the first shaft 21' and the housing 23'.

The first force means 34, 34' can, for example, consist of a pneumatic or hydraulic cylinder, a ball screw or an electric linear motor. In the first and second embodiments, the first force means 34, 34' is a pneumatic or hydraulic cylinder 41, 41'. According to the first embodiment, the piston rod 42 of the cylinder 41 is coupled to the lever 35. According to the second embodiment, the piston 42' of the cylinder 41' is integral with the outer bearing ring 26' of the first bearing 24', said outer bearing ring being in contact with the inside of the housing 23'.

The second force means 36, 36' can consist, for example, of an electric, hydraulic or pneumatic motor, which can be combined with a measuring means (not shown) in order to measure the torque applied to the fastener element 1. The second force means can also be combined with a flywheel (not shown) which is caused to rotate at a speed corresponding to the predetermined rpm for friction heat between the fastener element 1 and the component 2. The rotation of the flywheel is allowed to be reduced successively to a predetermined value, whereafter the mounting of the fastener element 1 is completed in accordance with the method of the invention.

When the fastener element 1 is mounted in the component 2, the tool 20, 20' can be used to check whether the fastener element 1 is securely fixed in the component 2. This is done by the entire tool 20, 20' subjecting the fastener element 1 to a force up to a limit value suitable for the check. This force strives to pull the fastener element out of the hole 4 in the component 2, i.e. in the direction from the second end 8 to the first end 7 of the cylindrical portion 3. At the same time, the fastener element 1 can be subjected to a torque up to a limit value suitable for the check. This torque is generated by the second force means 36, 36'. If the fastener element 1 passes the check, then it fulfills the requirements placed on the combined rivet and frictional welding joint.

Finally, the rotational direction of the first shaft 21, 21' is reversed so that the holder 30, 30' is screwed out of the fastener element 1.

What is claimed is:

1. Method of mounting a fastener element (1) in a component (2), said fastener element (1) being provided with a deformable, cylindrical portion (3) which has an axis of symmetry, said cylindrical portion (3) being inserted into a through-hole (4) in the component (2), whereafter the cylindrical portion (3) is deformed in its longitudinal direction by means of a compressive force, so that the length of the cylindrical portion (3) is reduced, comprising applying a torque about the axis of symmetry of the cylindrical portion (3), measuring the torque, keeping the compressive force constant or rendering the torque when the torque, due to the deformation of the cylindrical portion (3), reaches a predetermined value, thereafter applying a torque exceeding the predetermined torque about the axis of symmetry of the cylindrical portion (3) so that the fastener element (1) begins to rotate at a predetermined rotational speed, generating frictional heat between the contact surfaces of the fastener element (1) and the component (2), stopping the rotation when a predetermined time has passed, and thereafter further deforming the cylindrical portion (3), by means of compressive force, in its longitudinal direction so that a combined rivet and frictional welding joint between the fastener element (1) and the component (2) is obtained.

2. Method according to claim 1, wherein the rotation is stopped when a predetermined temperature, caused by frictional heat, has been reached.

3. Method according to claim 1, wherein the cylindrical portion (3) is deformed in its longitudinal direction by means of a compressive force at the same time as frictional heat is generated when the cylindrical portion (3) rotates.

4. Method according to claim 1, wherein the fastener element (1) is mounted in the component (2) by means of a tool (20, 20') which achieves the compressive force acting on the cylindrical portion (3) by placing an abutment (33, 33') of the tool (20, 20') on a first end (7) of the cylindrical portion (3), and a tensile force generated by the tool (20, 20') is applied at the same time at a second end (8) of the cylindrical portion (3), said tensile force acting in the direction towards the first end (7).

5. Joint, comprising a fastener element (1) with a deformable cylindrical portion (3), which is intended to be fixed in a through-hole (4) disposed in a component (2), the cylindrical portion (3) having a first end (7) and a second end (8), wherein the cylindrical portion (3) of the fastener element (1) is mounted in the hole (4) firstly with a bead (13) formed by deformation of the cylindrical portion (3), and secondly with a frictional welding, joint (35) in the contact surfaces between the cylindrical portion (3) and the component (2).

6. Joint according to claim 5, wherein the first end (7) is provided with a flange (18).

7. Joint according to claim 5, wherein the cylindrical portion (3) is provided with a circular through-hole (9) and a screw thread (10) is arranged in the hole (9) near the second end (8).

8. Joint according to claim 5, wherein the cylindrical portion (3) is provided with a stud (16) joined to the cylindrical portion (3) at its second end (8), the stud (16) extends from the second end (8) in the direction towards and past the first end (7), and the stud (16) is provided with an external screw thread (17) in that portion which extends past the first end (7) of the cylindrical portion (3).

9. Tool for mounting a fastener element (1) in a component (2), said tool (20, 20') comprising first and second rotary shafts (21, 21', 22, 22'), which are mounted in a housing (23, 23') the first rotary shaft (21, 21') having a first and a second end (28, 28', 29, 29'), said first end (28, 28') being provided with a holder (30, 30') which is intended for the fastener element (1), the second rotary shaft (22, 22') being concentric with the first shaft (21, 21') and the second rotary shaft (22, 22') having a first and a second end (31, 31', 32, 32'), said first end (31, 31') being provided with an abutment (33, 33') which is intended to abut against the fastener element (1), the first end (28, 28') of the first shaft (21, 21') and the first end (31, 31') of the second shaft (22, 22')being directed in the same direction, the first shaft (21, 21') being axially displaceable relative to the second shaft (22, 22') by means of a first force means (34, 34'), the first shaft (21, 21') and the second shaft (22, 22') being locked circumferentially in relation to each other, so that they are prevented from rotating relative to each other, the first shaft (21, 21') being rotatably driven by means of a second force means (36, 36'), and the second force means (36, 36') being coupled to the first shaft (21, 21') by means of a coupling (37, 37') which permits the first shaft (21, 21') to be displaced axially relative to the second force means (36, 36').

10. Tool according to claim 9, wherein the first force means (34) is located outside the housing (23), and a lever (35) arranged on the first force means (34) transmitting a linear movement from the first force means (34) to the first rotary shaft (21) via a bearing (24).

11. Tool according to claim 9, wherein the first force means (34') is located inside the housing (23') and surrounds the first rotary shaft (21'), the first force means (34') transmitting a linear movement to the first shaft (21') via a bearing (24').

* * * * *